US006959047B1

(12) United States Patent
Al-Dhahir et al.

(10) Patent No.: US 6,959,047 B1
(45) Date of Patent: Oct. 25, 2005

(54) TRAINING-BASED CHANNEL ESTIMATION FOR MULTIPLE-ANTENNAS

(75) Inventors: Naofal Al-Dhahir, Chatham, NJ (US); Christine Fragouli, Madison, NJ (US); William Turin, East Brunswick, NJ (US)

(73) Assignee: AT&T Corp, New York, NY (US)

( * ) Notice: Subject to any disclaimer, the term of this patent is extended or adjusted under 35 U.S.C. 154(b) by 769 days.

(21) Appl. No.: 09/956,648

(22) Filed: Sep. 20, 2001

Related U.S. Application Data

(60) Provisional application No. 60/282,647, filed on Apr. 9, 2001.

(51) Int. Cl.$^7$ .............................. H04B 7/02; H04L 1/02
(52) U.S. Cl. ...................... 375/267; 375/229; 375/285; 375/308; 375/347; 375/350; 370/208; 342/367
(58) Field of Search ........................ 342/367; 370/208; 375/229, 267, 285, 308, 347, 350

(56) References Cited

U.S. PATENT DOCUMENTS

2002/0067309 A1 * 6/2002 Baker et al. ................ 342/367
2004/0013211 A1 * 1/2004 Lindskog et al. ........... 375/347

OTHER PUBLICATIONS

Optimal space-time block codes for CDMA systems; Geng, J.; Mitra, U.; Fitz, M.P.; MILCOM 2000. 21st Century Military COmmunications Conference Proceedings, vol.: 1, Oct. 22-25, 2000 pp.: 387-391 vol. 1.*
A space-time coding modem for high-data-rate wireless communications; Naguib, A.F.; Tarokh, V.; Seshadri, N.; Calderbank, A.R.; Selected Areas in Communications, IEEE Journal on, vol.: 16, Issue: 8, Oct. 1998 pp.: 1459-1478.*
E Lindskog et al, A Transmit Diversity Scheme for Channels With Intersymbol Interferecne, ICC, 1:307-311, 2000.

* cited by examiner

*Primary Examiner*—Stephen Chin
*Assistant Examiner*—Erin M. File
(74) *Attorney, Agent, or Firm*—Henry T. Brendzel

(57) ABSTRACT

The burden of designing multiple training sequences for systems having multiple transmit antennas, is drastically reduced by employing a single sequence from which the necessary multiple sequences are developed. The single sequence is selected to create sequences that have an impulse-like autocorrelation function and zero cross correlations. A sequence of any desired length $N_t$ can be realized for an arbitrary number of channel taps, L. The created sequences can be restricted to a standard constellation (that is used in transmitting information symbols) so that a common constellation mapper is used for both the information signals and the training sequence. In some applications a a training sequence may be selected so that it is encoded with the same encoder that is used for encoding information symbols. Both block and trellis coding is possible in embodiments that employ this approach.

28 Claims, 4 Drawing Sheets

TRAINING-BASED CHANNEL ESTIMATION FOR MULTIPLE-ANTENNAS

This invention claims priority from provisional application No. 60/282,647, filed Apr. 9, 2001.

BACKGROUND OF THE INVENTION

This relates to space-time coding, and more particularly, to channel estimation in space-time coding arrangements.

Space-Time coding (STC) is a powerful wireless transmission technology that enables joint optimized designs of modulation, coding, and transmit diversity modules on wireless links. A key feature of STC is that channel knowledge is not required at the transmitter. While several non-coherent STC schemes have been invented that also do not require channel information at the receiver, they suffer performance penalties relative to coherent techniques. Such non-coherent techniques are therefore more suitable for rapidly fading channels that experience significant variation with the transmission block. However, for quasi static or slowly varying fading channels, training-based channel estimation at the receiver is commonly employed, because it offers better performance.

For single transmit antenna situations, it is known that a training sequence can be constructed that achieves a channel estimation with minimum mean squared error (optimal sequences) by selecting symbols from an $N^{th}$ root-of-unit alphabet of symbols $$e^{\frac{i2\pi k}{N}},$$

$k=0, 1, 2, \ldots (N-1)$, when the alphabet size $N$ is not constrained. Such sequences are the Perfect Roots-of-Unity Sequences (PRUS) that have been proposed in the literature, for example, by W. H. Mow, "Sequence Design for Spread Spectrum," *The Chinese University Press, Chinese University of Hong Kong*, 1995. The training sequence length, $N_t$, determines the smallest possible alphabet size. Indeed, it has been shown that for any given length $N_t$, there exists a PRUS with alphabet size $N=2 N_t$, and that for some values of $N_t$ smaller alphabet sizes are possible. It follows that a PRUS of a predetermined length might employ a constellation that is other than a "standard" constellation, where a "standard" constellation is one that has a power of 2 number of symbols. Binary phase shift keying (BPSK), quadrature phase shift keying (QPSK), and 8-point phase shift keying (8-PSK) are examples of a standard constellation. Most, if not all, STC systems employ standard constellations for the transmission of information.

Another known approach for creating training sequences constrains the training sequence symbols to a specific (standard) constellation, typically, BPSK, QPSK, or 8-PSK in order that the transmitter and receiver implementations would be simpler (a single mapper in the transmitter and an inverse mapper in the receiver—rather than two). In such a case, however, optimal sequences do not exist for all training lengths $N_t$. Instead, exhaustive searches must be carried out to identify sub-optimal sequences according to some performance criteria. Alas, such searches may be computationally prohibitive. For example, in the third generation TDMA proposal that is considered by the industry, 8-PSK constellation symbols are transmitted in a block that includes 116 information symbols, and 26 training symbols ($N_t$=26). No optimal training sequence exists for this value of $N_t$ and constellation size and number of channel taps to estimate, L.

When, for example, two transmit antennas are employed, a training sequence is needed for each antenna, and ideally, the sequences should be uncorrelated. One known way to arrive at such sequences is through an exhaustive search in the sequences space. This space can be quite large. For example, when employing two antennas, and a training sequence of 26 symbols for each antenna, this space contains $8^{2 \times 26}$ sequences. For current computational technology, this is a prohibitively large space for exhaustive searching. Reducing the constellation of the training sequence to BPSK (from 8-PSK) reduces the search to $2^{2 \times 26}$ sequences, but that is still quite prohibitively large; and the reduction to a BPSK sequence would increase the achievable mean squared error. Moreover, once the two uncorrelated sequences are found, a generator is necessary for each of the sequences, resulting in an arrangement (for a two antenna case) as shown in FIG. 1, which includes transmitter 10 that includes information encoder 13 that feeds constellation mapper 14 that drives antennas 11 and 12 via switches 15 and 16. To provide training sequences, transmitter 10 includes sequence generator 5 followed by constellation mapper 6 that feeds antenna 11 via switch 15, and sequence generator 7 followed by constellation mapper 8 that feeds antenna 12 via switch 16.

SUMMARY OF THE INVENTION

As advance in the art is achieved with an approach that drastically reduces the problem of designing multiple training sequences for systems having multiple transmit antennas, by employing a single sequence from which the necessary multiple sequences are developed. The single sequence is selected to develop the multiple sequences that have impulse-like autocorrelation functions and zero cross correlations. A sequence of any desired length $N_t$ can be realized for an arbitrary number of channel taps, L.

In one approach, a sequence having an impulse-like autocorrelation function is restricted advantageously to a standard constellation (that is used in transmitting information symbols) so a common constellation mapper is used for both the information signals and the training sequence.

In another approach, a training sequence is selected so that it is encoded with the same encoder that is used for encoding information symbols. Both block and trellis coding is possible in embodiments that employ this approach.

DETAILED DESCRIPTION

The following mathematical development focuses on a system having two transmit antennas and one receive antenna. It should be understood, however, that a skilled artisan could easily extend this mathematical development to more than two transmit antennas, and to more than one receive antenna.

Figure 2:
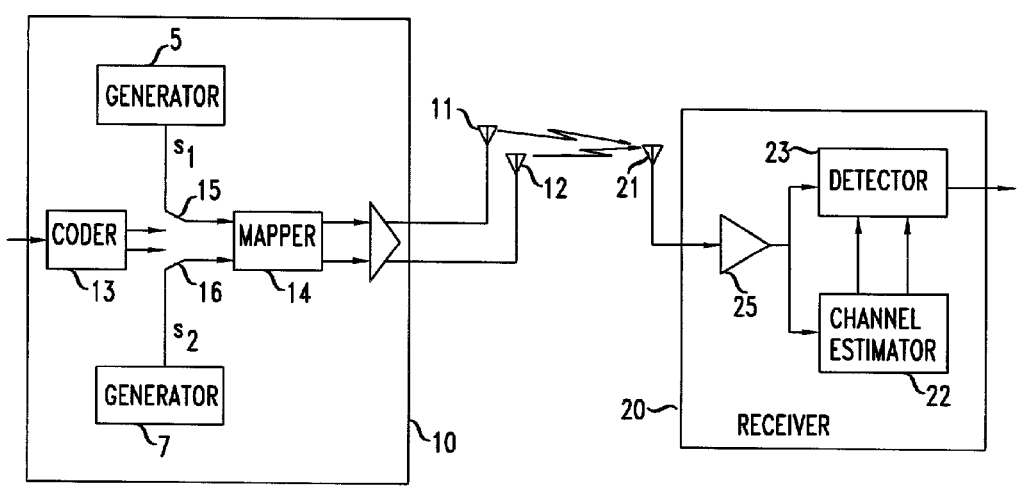
FIG. 2 shows an arrangement where the training sequences employ the same constellation mapper that is employed in mapping space-time encoded information symbols.

FIG. 2 shows an arrangement a transmitter with two transmit antennas 11 and 12 that transmits signals $s_1$ and $s_2$, respectively, and a receiver with receive antenna 21, and channels $h_1$ (from antenna 11 to antenna 21) and $h_2$ (from antenna 12 to antenna 21) therebetween. Channels $h_1$ and $h_2$ can be expressed as a finite impulse response (FIR) filter with L taps. Thus, the signal received at antenna 21 at time k, y(k), can be expressed as $$y(k) = \sum_{i=0}^{L-1} h_1(i)s_1(\bar{k}-i) + \sum_{i=0}^{L-1} h_2(i)s_2(k-i) + z(k) \quad (1)$$

where z(k) is noise, which is assumed to be AWGN (additive white Gaussian noise).

Figure 1:
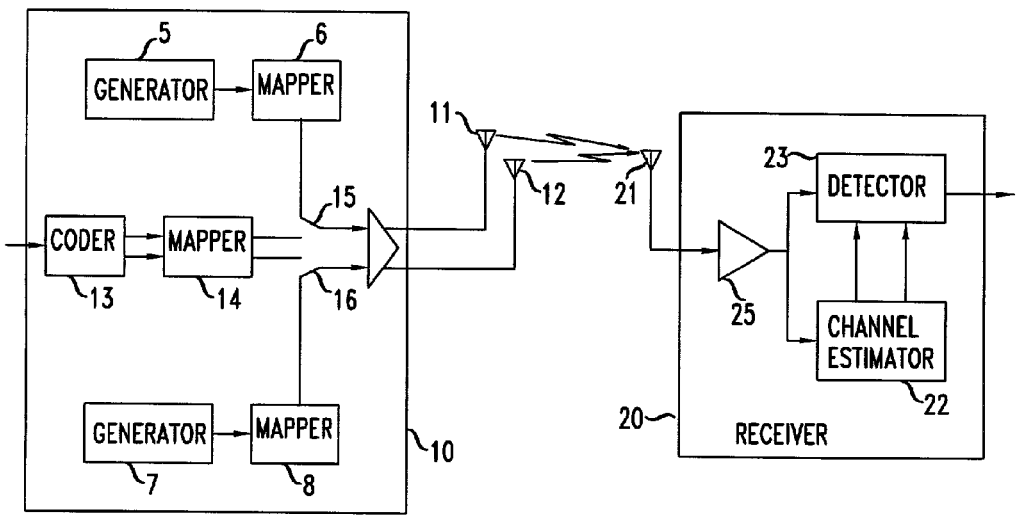
FIG. 1 shows a prior art arrangement of a two-antenna transmitter and a one antenna receiver, where training sequences are independently generated for the two transmitting antennas.

The inputs sequences $s_1$, and $s_2$ belong to a finite signals constellation and can be assumed, without loss of generality, that they are transmitted in data blocks that consist of $N_i$, information symbols and $N_t$ training symbols. If $N_t$ training symbols are employed to estimate the L taps of a channel in the case of a single antenna, then for a two antenna case such as shown in FIG. 1, one needs to employ $2N_t$ training symbols to estimate the 2L unknown coefficients (of $h_1$ and $h_2$).

When a training sequence of length $N_t$, is transmitted, the first L received signals are corrupted by the preceding symbols. Therefore, the useful portion of the transmitted $N_t$ sequence is from L to $N_t$. Expressing equation (2) in matrix notation over the useful portion of a transmitted training sequence yields $$y = Sh + z = [S_1(L, N_t) \quad S_2(L, N_t)] \begin{bmatrix} h_1(L) \\ h_2(L) \end{bmatrix} + z, \quad (2)$$

where y and z are vectors with $(N_t-L+1)$ elements, $S_1(L,N_t)$ and $S_2(L,N_t)$ are convolution matrices of dimension $(N_t-L+1) \times L$, and $h_1(L)$ and $h_2(L)$ are of dimension $L \times 1$; that is, $$S_1(L, N_t) = \begin{bmatrix} s_1(L-1) & s_1(L-2) & \cdots & s_1(0) \\ s_1(L) & s_1(L-1) & \cdots & s_1(1) \\ \vdots & \vdots & \ddots & \vdots \\ s_1(N_t-1) & s_1(N_t-2) & \square & s_1(N_t-L) \end{bmatrix}, \quad (3)$$

and $$h_1(L) = \begin{bmatrix} h_1(0) \\ h_1(1) \\ \vdots \\ h_1(L-1) \end{bmatrix} \text{ for } i = 1, 2. \quad (4)$$

If the convolution matrix is to have at least L rows, $N_t$ must be at least 2L−1. In the context of this disclosure, the S matrix is termed the "training matrix" and, as indicated above, it is a convolution matrix that relates to signals received from solely in response to training sequence symbols; i.e., not corrupted by signals sent prior to the sending of the training sequence.

The linear least squared channel estimates, ĥ, assuming S has full column rank, is $$\hat{h} = \begin{bmatrix} \hat{h}_1 \\ \hat{h}_2 \end{bmatrix} = (S^H S)^{-1} S^H y, \quad (5)$$

where the $(\cdot)^H$ and $(\cdot)^{-1}$ designate the complex-conjugate transpose (Hermitian) and the inverse, respectively. For zero mean noise, the channel estimation mean squared error is defined by $$MSE = E[(h-\hat{h})^H(h-\hat{h})] = 2\sigma^2 tr((S^H S)^{-1}), \quad (6)$$

where tr(.) denotes a trace of a matrix. The minimum MSE, MMSE, is equal to $$MMSE = \frac{2\sigma^2 L}{(N_t - L + 1)}, \quad (7)$$

which is achieved if and only if $$S^H S = \begin{bmatrix} S_1^H S_1 & S_2^H S_1 \\ S_1^H S_2 & S_2^H S_2 \end{bmatrix} = (N_t - L + 1)I_{2L} \quad (8)$$

where $I_{2L}$ is the 2L×2L identity matrix. The sequences $s_1$ and $s_2$ that satisfy equation (8) are optimal sequences. Equation (8) effectively states that the optimal sequences have an impulse-like autocorrelation function (e.g. $S_1^H S$ corresponds to the identity matrix, I, multiplied by a scalar) and zero cross-correlations.

A straightforward approach for designing two training sequences of length $N_t$ each is to estimates two L-taps channels (i.e., two channels having L unknowns each, or a total of 2L unknowns) is to design a single training sequence s of length $N'_t$ ($N'_t = N_t + L$) that estimates a single channel with L'=2L taps (i.e., a single channel having 2L unknowns).

Figure 3:
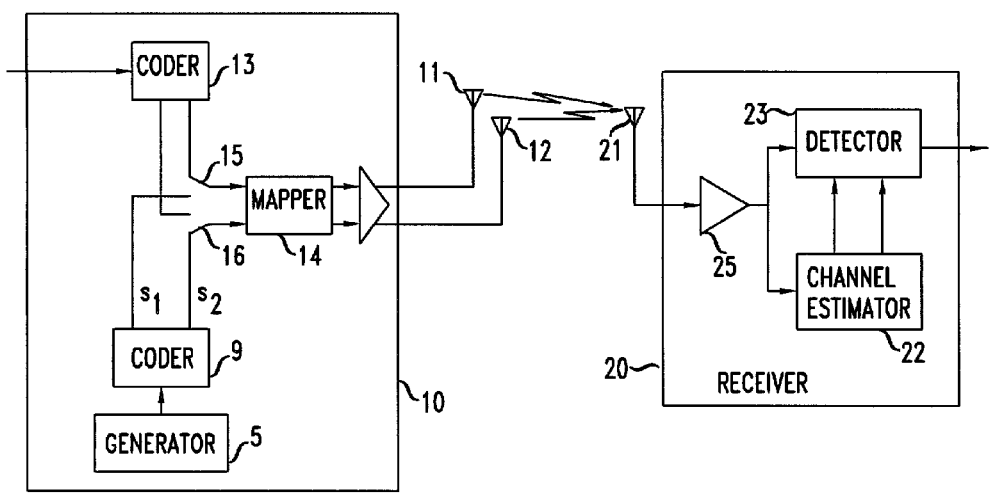
FIG. 3 presents a block diagram of an arrangement where a single encoder generates the training sequences for the two transmitter antennas.

Generalizing, $N'_t=N_t+(n-2)L$, where n is the number of antennas. One can thus view the received signal as $$y=S(L',N'_t)h(L')+z \quad (9)$$

where S is a convolution matrix of dimension $(N'_t-L'+1) \times L'$. Again, for optimality, the imposed requirement is that $$S^H(L', N'_t)S(L', t)=(N'_t-L'+1)I_{2L}, \quad (10)$$

and once the sequence s is found, the task is to create the subsequences $s_1$ and $s_2$ from the found sequence s. Preferably, the subsequences $s_1$ and $s_2$ can be algorithmically generated from sequence s. Conversely, one may find subsequences $s_1$, and $s_2$ that satisfy the requirements of equation (8) and be such that sequence s can be algorithmically generated. This permits the use of a single training signal generator that, through a predetermined algorithm (i.e., coding) develops the subsequences $s_1$ and $s_2$. Both approaches lead to embodiment depicted in FIG. 3, where information signals are applied to encoder 13 that generates two streams of symbols that are applied to constellation mapper 14 via switches 15 and 16. Generator 5 creates a training sequence that is applied to encoder 9, and encoder 9 generates the subsequences $s_1$, and $s_2$ that are applied to constellation mapper 14 via switches 15 and 16.

Actually, once we realized that the complexity of the training sequence determination problem can be reduced by focusing on the creation of a single sequence from which a plurality of sequences that meet the requirements of equation (8) can be generated, it became apparent that there is no requirement for s to be longer than $s_1$ and $s_2$.

Figure 4:
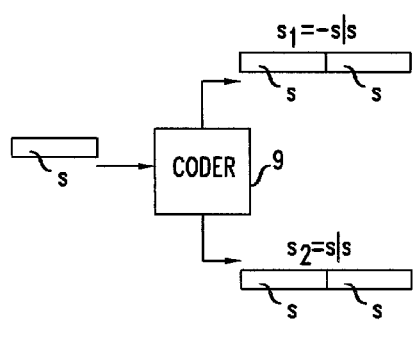
FIG. 4 shows one encoding realization for encoder 9 of FIG. 3.

FIG. 4 presents one approach for generating optimal subsequences $s_1$ and $s_2$ that meet the requirements of equation (8) and that can be generated from a single sequence. In accordance with FIG. 4, generator 5 develops a sequence s of length $N_t/2$, and encoder 9 develops therefrom the sequences $s_1=-s|s$ and $s_2=s|s$, where the "|" symbol stands for concatenation; e.g., sequence $s_1$ comprises sequence $-s$ concatenated with, or followed by, sequence s. Thus, during the training sequence, antenna 11 transmits the sequence $-s$ during the first $N_t/2$ time periods, and the sequence s during the last $N_t/2$ time periods. Antenna 12 transmits the sequence s during both the first and last $N_t/2$ time periods.

In response to the training sequences transmitted by antennas 11 and 12, receiving antenna 21 develops the signal vector y (where the elements of the vector y are the signals received from antennas 11 and 12). Considering the received signal during the first $N_t/2$ time periods as $y_1$ and during the last $N_t/2$ time periods as $y_2$, and employing only the useful portion of the signal (that is, the portions not corrupted by signals that are not part of the training sequence) one gets $$\begin{bmatrix} y_1 \\ y_2 \end{bmatrix} = \begin{bmatrix} -S & S \\ S & S \end{bmatrix}\begin{bmatrix} h_1 \\ h_2 \end{bmatrix} + \begin{bmatrix} z_1 \\ z_2 \end{bmatrix} \quad (11)$$

where S is a convolution matrix of dimension $(N_t-L+1) \times L$. In accordance with the principles disclosed herein, the FIG. 3 receiver multiplies the received signal in processor 25 with the transpose conjugate matrix $S^H$, yielding $$\begin{bmatrix} r_1 \\ r_2 \end{bmatrix} = \begin{bmatrix} -S^H & S^H \\ S^H & S^H \end{bmatrix}\begin{bmatrix} y_1 \\ y_2 \end{bmatrix} = \begin{bmatrix} 2S^HS & 0 \\ 0 & 2S^HS \end{bmatrix}\begin{bmatrix} h_1 \\ h_2 \end{bmatrix} + \begin{bmatrix} \bar{z}_1 \\ \bar{z}_2 \end{bmatrix} \quad (12)$$

where $$\begin{bmatrix} \bar{z}_1 \\ \bar{z}_2 \end{bmatrix} = \begin{bmatrix} -S^H & S^H \\ S^H & S^H \end{bmatrix}\begin{bmatrix} z_1 \\ z_2 \end{bmatrix}. \quad (13)$$

If the sequence s is such that $S^HS=(N_t-L+1)I_L$, then $$\begin{bmatrix} r_1 \\ r_2 \end{bmatrix} = 2(N_t-L+1)\begin{bmatrix} h_1 \\ h_2 \end{bmatrix} + \begin{bmatrix} \bar{z}_1 \\ \bar{z}_2 \end{bmatrix}. \quad (14)$$

If the noise is white, then the linear processing at the receiver does not color it, and the channel transfer functions correspond to $$h_1=1/2(N_t-L+1)r_1$$
$$h_2=1/2(N_t-L+1)r_2. \quad (15)$$

with a minimum squared error, MSE, that achieves the lower bound expressed in equation (7); to wit, $$MSE = \frac{2\sigma^2 L}{(N_t-L+1)} \quad (16)$$

The above result can be generalized to allow any matrix U to be used to encode the training sequence, s, so that $$\begin{bmatrix} y_1 \\ y_2 \end{bmatrix} = U\begin{bmatrix} h_1 \\ h_2 \end{bmatrix} + \begin{bmatrix} z_1 \\ z_2 \end{bmatrix} \quad (17)$$

as long as $U^HU=2I$ for a two antennas case, and $U^HU=KI$ for an K antenna case.

Figure 5:
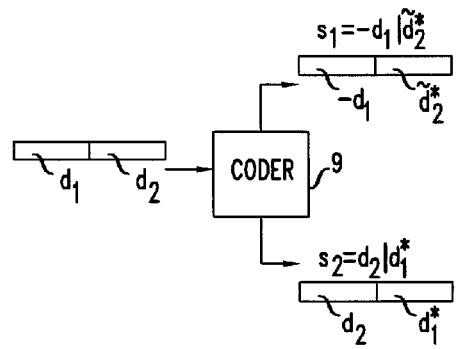
FIG. 5 shows another encoding realization for encoder 9 of FIG. 3.

Whereas FIG. 4 presents a method for developing sequences $s_1$ and $s_2$ of length $N_t$ from a sequence s that is $N_t/2$ symbols long, FIG. 5 presents a method for developing sequences $s_1$ and $s_2$ of length $N_t$ from a sequence s that is $2N_t$ symbols long, which consists of a sequence $d_1=[s(0) \ s(1) \dots s(N_t-1)]$ followed by a sequence $d_2=[s(0) \ s(1) \dots s(N_t-1)]$. In accordance with this approach, $s_1=d_1|-\tilde{d}_2^*$ and $s_2=d_2|\tilde{d}_1^*$. The sequence $\tilde{d}_1$ corresponds to the sequence $d_1$ with its elements in reverse order. The symbol $\tilde{d}_1^*$ operation corresponds to the sequence $d_1$ with its elements in reverse order and converted to their respective complex conjugates.

Figure 6:
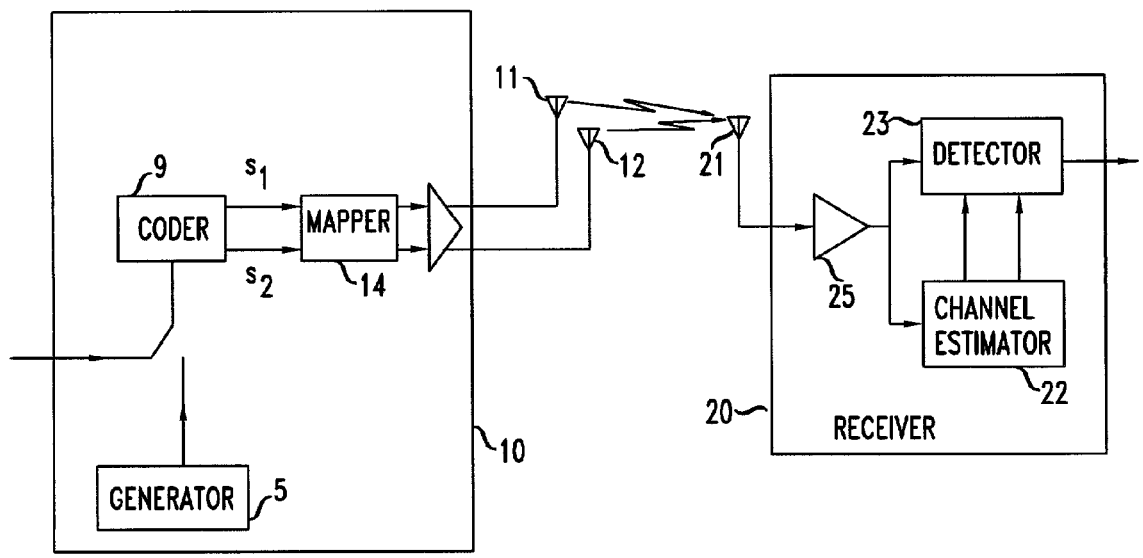
FIG. 6 presents a block diagram of an arrangement where a single encoder generates both the training sequences and the information symbols for the two transmitter antennas.

The FIG. 5 encoding is very similar to the encoding scheme disclosed by Alamouti in U.S. Pat. No. 6,185,258, issued Feb. 6, 2001, except that (a) the Alamouti scheme is symbols-centric whereas the FIG. 5 encoding is sequence-centric, and (b) the Alamouti scheme does not have the concept of a reverse order of a sequence (e.g., $\tilde{d}_1^*$). See also E. Lindskog and A. Paulraj titled "A Transmit Diversity Scheme for Channels With Intersymbol Interference," *ICC*, 1:307–311, 2000. An encoder 9 that is created for developing training sequences $s_1$ and $s_2$ in accordance with FIG. 5, can be constructed with a control terminal that is set to 1 during transmission of information and set to another value (e.g., 0, or to $N_t$ to indicate the length of the generated block) during transmission of the training sequence, leading to the simplified transmitter realization shown in FIG. 6. More importantly, such an arrangement leads to a simplified receiver because essentially the same decoder is used for both the information signals and the training signals.

With a signal arrangement as shown in FIG. 5, the signal captured at antenna 21 of receiver 20 is $$\begin{bmatrix} y_1 \\ y_2 \end{bmatrix} = \begin{bmatrix} -\tilde{D}_2^* & \tilde{D}_1^* \\ D_1^* & D_2^* \end{bmatrix} \begin{bmatrix} h_1 \\ h_2 \end{bmatrix} + \begin{bmatrix} z_1 \\ z_2 \end{bmatrix} \quad (18)$$

where the matrices $D_i$ and $\tilde{D}_i$ (for i=1, 2) are convolution matrices for $d_1$ and $\tilde{d}_1$, respectively, of dimension $(N_t-L+1) \times L$. Recalling from equation (8) that MMSE is achieved if and only if $D^H D$ has zeros off the diagonal; i.e., $$-\tilde{D}_1^T \tilde{D}_2^* + (D_2^*)^T D_1 = 0 \quad (19)$$

and $$-\tilde{D}_2^T \tilde{D}_1^* + (D_1^*)^T D_2 = 0 \quad (20)$$

and identity matrices on the diagonal; i.e., $$-\tilde{D}_2^T \tilde{D}_2^* + (D_1^*)^T D_1 = 2(N_t-L+1) I_L \quad (21)$$

and $$-\tilde{D}_1^T \tilde{D}_1^* + (D_2^*)^T D_2 = 2(N_t-L+1) I_L \quad (22)$$

Various arrangements that interrelate sequences $d_1$ and $d_2$ can be found that meet the above requirement. By way of example (and not by way of limitation), a number of simple choices satisfy these conditions follow.

Figure 7:
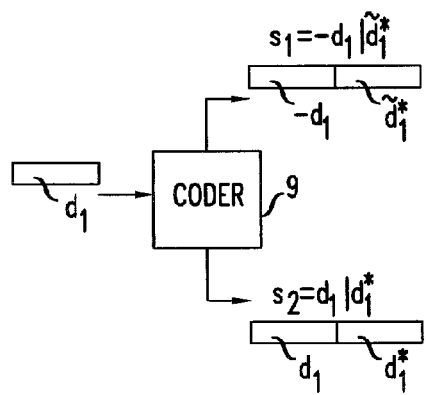
FIG. 7 shows one encoding realization for encoder 9 of FIG. 6.

(1) $(D_1^*)^T D_1 = (N_t-L+1) I_L$, $\tilde{D}_1 = D_1$, and $D_2 = D_1$. To show that equation (21) holds, one may note that $\tilde{D}_2^T \tilde{D}_2^*$ (the first term in the equation) becomes $D_1^T D_1^*$, but if $(D_1^*)^T D_1$ is a diagonal matrix then so is $\tilde{D}_2^T \tilde{D}_2^*$. Thus, according to this training sequence embodiment, one needs to only identify a sequence $d_1$ that is symmetric about its center, with an impulse-like autocorrelation function, and set $d_2$ equal to $d_1$. This is shown in FIG. 7.

Figure 8:
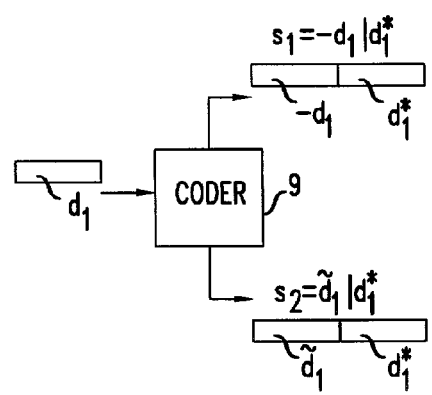
FIG. 8 shows another encoding realization for encoder 9 of FIG. 6.

(2) $(D_1^*)^T D_1 = (N_t-L+1) I_L$, and $\tilde{D}_2 = D_1$. To show that equation (21) holds, one may note that the $\tilde{D}_2^T \tilde{D}_2^*$ first term in the equation also becomes $D_1^T D_1^*$. Thus, according to this training sequence embodiment, one needs to only identify a sequence $d_1$ with an impulse-like autocorrelation function, and set $d_2$ equal to $\tilde{d}_1$. This is shown in FIG. 8.

Figure 9:
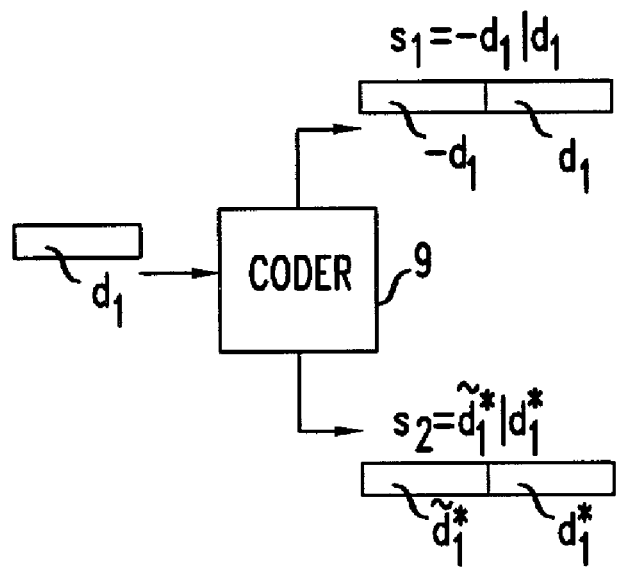
FIG. 9 shows yet another encoding realization for encoder 9 of FIG. 6.

(3) $(D_1^*)^T D_1 = (N_t-L+1) I_L$, and $\tilde{D}_2^* = D_1$. To show that equation (21) holds, one may note that the $\tilde{D}_2^T \tilde{D}_2^*$ first term in the equation becomes $(D_1^*)^T D_1$. Thus, according to this training sequence embodiment, one needs to only identify a sequence $d_1$ with an impulse-like autocorrelation function, and set $d_2$ equal to $\tilde{d}_1^*$. This is shown in FIG. 9.

Training Sequences Employing Trellis Coding

Consider a trellis code with m memory elements and outputs from a constellation of size C, over a single channel with memory $2^m C^{(L-1)}-1$. To perform joint equalization and decoding one needs a product trellis with $2^m C^{(L-1)}$ states. For a space-time trellis code with m memory elements, n transmit antennas and one receive antenna, over a channel with memory (L-1), one needs a product trellis with $2^m C^{n(L-1)}$.

The receiver can incorporate the space-time trellis code structure in the channel model to create an equivalent single-input, single output channel, $h_{eq}$, of length m+L. The trellis, in such a case, involves $C^{(m+L-1)}$ states. The approach disclosed herein uses a single training sequence at the input of the space-time trellis encoder to directly estimate $h_{eq}$ used by the joint space-time equalizer/decoder. The channel $h_{eq}$ that incorporates the space-time code structure typically has a longer memory than the channel $h_1$ and $h_2$ (in a system where there are two transmitting antennas and one receiving antenna).

Figure 10:
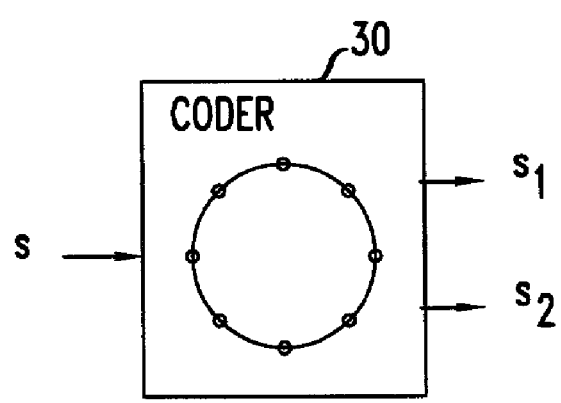
FIG. 10 shows the constellation of an 8-PSK encoder realization for encoder 9.

To illustrate, assume an encoder 30 as depicted in FIG. 10 that employs an 8-PSK constellation of symbols to encode data from a training sequence generator into a sequence s of symbols taken from the set $e^{i2\pi p_k/8}$, $p_k=0, 1, 2, \ldots, 7$, where the training sequences $s_1$ and $s_2$ are algorithmically derived within encoder 30 from sequence s. Specifically, assume that $s_1(k)=s(k)$, and that $s_2(k)=(-1)^{p_{k-1}} s(k-1)$, which means that $s_2(k)=s(k-1)$ when $s(k-1)$ is an even member of the constellation ($e^{i0}$, $e^{i\pi/2}$, $e^{i\pi}$, and $e^{i3\pi/2}$), and $s_2(k)=-s(k-1)$ when $s(k-1)$ is an odd member of the constellation.

With such an arrangement, the received signal at time k can be expressed as $$y(k) = \sum_{i=0}^{L-1} h_1(i) s(k-i) + \sum_{i=0}^{L-1} h_2(i,k)(-1)^{p_{k-i-1}} s(k-i-1) + z(k) \quad (23)$$

$$= \sum_{i=0}^{L} h_{eq}(i) s(k-i) + z(k),$$

where $$h_{eq}(i,k) = \begin{cases} h_1(0) & \text{for } i=0 \\ h_1(i) + (-1)^{p_{k-i}} h_2(i-1) & \text{for } 0 < i < L \\ (-1)^{p_{k-L}} h_2(L-1) & \text{for } i = L. \end{cases} \quad (24)$$

A block of received signals (corresponding to the useful portion of the training sequence block) can be expressed in matrix form by $$y = S h_{eq} + z \quad (25)$$

where $$S = \begin{bmatrix} s(L) & s(L-1) & \cdots & S(0) \\ S(l+1) & s(L) & \cdots & s(1) \\ \vdots & \vdots & & \vdots \\ s(N_t-1) & s(N_t-2) & \cdots & s(N_t-L-1) \end{bmatrix} \begin{bmatrix} h_{eq}(0, L) \\ h_{eq}(1, L+1) \\ \vdots \\ h_{eq}(L, N_t-1) \end{bmatrix} \quad (26)$$

and following the principles disclosed above, it can be realized that when the training sequence is properly selected so that $S^H S$ is a diagonal matrix, i.e., $S^H S=(N_t-L)I_{L+1}$, an estimate of $h_{eq}$ that is, $\hat{h}_{eq}$, is obtained from $$\hat{h}_{eq} = \frac{S^H y}{(N_t-L)}. \quad (27)$$

If the training sequence were to comprise only the even constellation symbols, $e^{i2\pi k/8}$ k=0, 2, 4, 6, per equation (24), the elements of $\tilde{h}_{eq}$ would correspond to $$h_{eq}^{even} = [h_1(0), h_1(1)+h_2(0), h_1(2)+h_2(1), \ldots h_1(L-1) +h_2(L-2), h_2(L-1)]. \quad (28)$$

If the training sequence were to comprise only the odd constellation symbols, $e^{i2\pi k/8}$, k=1, 3, 5, 7, the elements of $\tilde{h}_{eq}$ would correspond to $$h_{eq}^{odd} = [h_1(0), h_1(1)-h_2(0), h_1(2)-h_2(1), \ldots h_1(L-1) -h_2(L-2), -h_2(L-1)]. \quad (29)$$

If the training sequence were to comprise a segment of only even constellation symbols followed by only odd constellation symbols (or vice versa), then channel estimator 22 within receiver 20 can determine the $h_{eq}^{even}$ coefficients from the segment that transmitted only the even constellation symbols, and can determine the $h_{eq}^{odd}$ coefficients from the segment that transmitted only the even constellation symbols. Once both $h_{eq}^{even}$ and $h_{eq}^{odd}$ are known, estimator 22 can obtain the coefficients of $h_1$ from $$[h_1(0), h_1(1), h_1(2), \ldots h_1(L-1)] = \frac{h_{eq}^{even} + h_{eq}^{odd}}{2} \quad (30)$$

and the coefficients of $h_2$ from $$[h_2(0), h_2(1), h_2(2), \ldots h_2(L-1)] = \frac{h_{eq}^{even} - h_{eq}^{odd}}{2}. \quad (31)$$

What remains, then, is to create a single training sequence s of length $N_t$ where one half of it (the $s_{even}$ portion) consists of only even constellation symbols (even sub-constellation), and another half of it (the $s_{odd}$ portion) consists of only odd constellation symbols (odd sub-constellation). The sequences $s_1$ and $s_2$ of length $N_t$ are derived from the sequence s by means of the 8-PSK space-time trellis encoder. The sequences $s_1$ and $s_2$ must also meet the requirements of equation (8). Once $s_{even}$ is found, $s_{odd}$ can simply be $$s_{odd} = \alpha s_{even}, \text{ where } \alpha = e^{i\pi k/4} \text{ for any k=1, 3, 5, 7.} \quad (32)$$

Therefore, the search for sequence s is reduced from a search in the of $8^{N_t}$ to a search for $s_{even}$ in the space $4^{(N_t/2)}$ such that, when concatenated with $s_{odd}$ that is computed from $s_{even}$ as specified in equation (32), yields a sequence s that has an autocorrelation function that is, or is close to being, impulse-like.

For a training sequence of length $N_t$=26, with an 8-PSK space-time trellis encoder, we have identified the 12 training sequences specified in Table 1 below.

TABLE 1

| sequence # | a | $S_e$ |
|---|---|---|
| 1 | exp(i5π/4) | −1 1 1 1 1 −1 −i −1 1 1 −1 1 1 |
| 2 | exp(i3π/4) | 1 1 −1 1 i i 1 −i i −1 −1 −1 1 |
| 3 | exp(iπ/4) | 1 −1 −1 −i i −i 1 1 1 −i −1 1 1 |
| 4 | exp(iπ/4) | 1 −1 −1 −i 1 −1 1 −i −i −i −1 1 1 |
| 5 | exp(iπ/4) | 1 i 1 1 i −1 −1 i 1 −1 1 i 1 |
| 6 | exp(i3π/4) | 1 i 1 i −1 −1 1 −1 −1 i 1 i 1 |
| 7 | exp(i7π/4) | 1 −i 1 1 −i −1 −1 −1 −i 1 −1 1 −i 1 |
| 8 | exp(i5π/4) | 1 −i 1 −1 i 1 −1 −i 1 1 1 −i 1 |
| 9 | exp(i3π/4) | −1 1 1 1 −1 −1 −i −1 −1 1 1 −1 1 1 |
| 10 | exp(i7π/4) | −1 i −1 −i 1 −i i i 1 i 1 −i 1 |
| 11 | exp(iπ/4) | −1 −i −1 i 1 i −i −i 1 −i 1 i 1 |
| 12 | exp(i3π/4) | −1 −i −1 i −1 i −i −i −1 −i 1 i 1 |

Construction of Training Sequence

While the above-disclosed materials provide a very significant improvement over the prior art, there is still the requirement of selecting a sequence $s_1$ with an impulse-like autocorrelation function. The following discloses one approach for identifying such a sequence without having to perform an exhaustive search.

A root-of-unity sequence with alphabet size N has complex roots of unity elements of the form $$e^{\frac{i2\pi k}{N}},$$

k=1, 2, . . . (N−1). As indicated above, the prior art has shown that perfect roots-of-unity sequences (PRUS) can be found for any training sequence of length $N_t$, as long as no constraint is imposed on the value of N. As also indicated above, however, it is considered disadvantageous to not limit N to a power of 2. Table 2 presents the number of PRUSs that were found to exist (through exhaustive search) for different sequence lengths when the N is restricted to 2 (BPSK), 4 (QPSK), or 8 (8-PSK). Cell entries in Table 2 with "-" indicate that sequence does not exist, and blank cells indicate that an exhaustive search for a sequence was not performed.

TABLE 2

| $N_t$ = | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| BPSK | — | — | 8 | — | — | — | — | — | — | — | — | — | — | — | — | — | — |
| QPSK | 8 | — | 32 | — | — | — | 128 | — | — | — | — | — | — | — | 6144 | — | — |
| 8-PSK | 16 | — | 128 | — | — | — | 512 | — | — | — | — | — | | | | | |

A sequence s of length $N_t$ is called L-perfect if the corresponding training matrix S of dimension $(N_t-L+1)\times L$ satisfies equation (8). Thus, an L-perfect sequence of length $N_t$ is optimal for a channel with L taps. It can be shown that the length $N_t$ of an L-perfect sequence from a $2^p$-alphabet can only be equal to $$N_t = \begin{Bmatrix} 2(L+i) & \text{for } L = \text{odd} \\ 2(L+i)-1 & \text{for } L = \text{even} \end{Bmatrix}, \text{ for } i = 0, 1, \ldots, \quad (33)$$

which is a necessary, but not sufficient, condition for L-perfect sequences of length $N_t$. Table 3 shows the minimum necessary $N_t$ for $L=2, 3, \ldots 10$, the size of the corresponding matrix S, and the results of an exhaustive search for L-perfect sequences (indicating the number of such sequences that were found). Cell entries marked "x" indicate that sequences exist, but number of such sequences it is not known.

TABLE 3

| L | 2 | 3 | 4 | 5 | 6 | 7 | 8 | 9 | 10 |
|---|---|---|---|---|---|---|---|---|---|
| $N_t$ | 3 | 6 | 7 | 10 | 11 | 14 | 15 | 18 | 19 |
| S | 2 × 2 | 4 × 3 | 4 × 4 | 6 × 5 | 6 × 6 | 8 × 7 | 8 × 8 | 10 × 9 | 10 × 10 |
| BPSK | 4 | 8 | 8 | — | — | — | — | — | — |
| QPSK | 16 | 64 | 64 | — | — | 128 | — | x | |
| 8-PSK | 64 | 512 | 512 | | | x | | x | |

It is known that with a PRUS of a given length, $N_{PRUS}$, one can estimate up to $L=N_{PRUS}$ unknowns. It can be shown that a training sequence of length $N_t$ is also an L-perfect training sequence if $$N_t=kN_{PRUS}+L-1 \text{ and } k \geq 1. \quad (34)$$

Accordingly, an L-perfect sequence of length $kN_{PRUS}+L-1$ can be constructed by selecting an $N_{PRUS}$ sequence, repeating it k times, and circularly extending it by L−1 symbols. Restated and amplified somewhat, for a selected PRUS of a given $N_{PRUS}$, i.e., $$s_p(N_{PRUS})=[s_p(0)\ s_p(1) \ldots s_p(N_{PRUS}-1)], \quad (35)$$

the L-perfect sequence of length $kN_{PRUS}+L-1$ is created from a concatenation of k $s_p(N_{PRUS})$ sequences followed by the first L−1 symbols of $s_p(N_{PRUS})$, or from a concatenation of the last L−1 symbols of $s_p(N_{PRUS})$ followed by k $s_p(N_{PRUS})$ sequences.

To illustrate, assume that the number of channel "taps" that need to be estimated, L, is 5, and that a QPSK alphabet is desired to be used. From the above it is known that $N_{PRUS}$ must be equal to or greater than 5, and from Table 2 it is known that the smallest $N_{PRUS}$ that can be found for QSPK that is larger than 5 is $N_{PRUS}=8$. Employing equation (34) yields $$N_t=kN_{PRUS}+L-1$$

$$=k\cdot 8+5-1$$

$$=12, 20, 28, \ldots \text{ for } k=1, 2, 3 \quad (36)$$

While an L-perfect training sequence cannot be constructed from PRUS sequences for values of $N_t$ other than values derived by operation of equation (34), it is known that, nevertheless, L-perfect sequences may exist. The only problem is that it may be prohibitively difficult to find them.

However, in accordance with the approach disclosed below, sub-optimal solutions are possible to create quite easily.

If it is given that the training sequence is $N_t$ long, one can express this length by $$N_t=kN_{PRUS}+L-1+M, \text{ where } M>0 \quad (37)$$

In accord with our approach, select a value of $N_{PRUS} \geq L$ that minimizes M, create a sequence of length $kN_{PRUS}+L-1$ as disclosed above, and then extend that sequence by adding M symbols. The M added symbols can be found by selecting, through an exhaustive search, the symbols that lead to the lowest estimation MSE. Alternatively, select a value of $N_{PRUS} \geq L$ that minimizes M' in the equation, $$N_t=kN_{PRUS}+L-1-M', \text{ where } M'>0 \quad (38)$$

create a sequence of length $kN_{PRUS}+L-1$ as disclosed above, and then drop the last (or first) M' symbols.

The receiver shown in FIG. 2 includes the channel estimator 22, which takes the received signal and multiplies it $S^H$ as appropriate; see equation (12), above.

We claim:

1. A space-time diversity transmitter that includes (a) n transmitting antennas, where n is greater than one, (b) an encoder of an applied information bit stream, said encoder developing n symbol streams, and (c) a constellation mapper responsive to said n symbol streams, for mapping symbols of each of said n symbol streams into a standard signal constellation to create a mapped stream, said constellation mapper applying each of the created n mapped stream to a different one of said n antennas, the improvement comprising:

a generator of a symbols sequence;

an encoder for creating n training sequences from said symbols sequence; and a training sequence mapper that maps said n training sequences onto a standard constellation to develop n mapped training sequences, and applies the n mapped training sequences to said n antennas at times when said constellation mapper stops applying said n mapped stream to said n antennas; where said n training sequences are selected to enable a receiver that receives said n training sequences to determine characteristics of a channel through which said n antennas communicate to said receiver, said n training sequences have a common length $N_t$ that is related to transmitted symbols memory, L−1, of communication medium interposed between said transmitter and said receiver, $N_t$ being at least equal to 2L−1, and said symbols sequence developed by said generator is $N_t+(n-2)L$ symbols long.

2. The transmitter of claim 1 where said sequence mapper employs a constellation taken from a set that includes Binary Phase Shift Keying (BPSK), Quadrature Phase Shift Keying (QPSK), and $8^{th}$ Order Phase Shift Keying (8-PSK).

3. A space-time diversity transmitter that includes (a) n transmitting antennas, where n is greater than one, (b) an encoder of an applied information bit stream, said encoder developing n symbol streams, and (c) a constellation mapper responsive to said n symbol streams, for mapping symbols of each of said n symbol streams into a standard signal constellation to create a mapped stream, said constellation mapper applying each of the created n mapped stream to a different one of said n antennas, the improvement comprising:
- a generator of a symbols sequence;
- an encoder for creating n training sequences from said symbols sequence; and a training sequence mapper that maps said n training sequences onto a standard constellation to develop n mapped training sequences, and applies the n mapped training sequences to said n antennas at times when said constellation mapper stops applying said n mapped stream to said n antennas; where said constellation mapper and said training sequence mapper are one and the same.

4. A space-time diversity transmitter that includes (a) n transmitting antennas, where n is greater than one, (b) an encoder of an applied information bit stream, said encoder developing n symbol streams, and (c) a constellation mapper responsive to said n symbol streams, for mapping symbols of each of said n symbol streams into a standard signal constellation to create a mapped stream, said constellation mapper applying each of the created n mapped stream to a different one of said n antennas, the improvement comprising:
- a generator of a symbols sequence;
- an encoder for creating n training sequences from said symbols sequence; and a training sequence mapper that maps said n training sequences onto a standard constellation to develop n mapped training sequences, and applies the n mapped training sequences to said n antennas at times when said constellation mapper stops applying said n mapped stream to said n antennas; where said constellation mapper also serves as said training sequence mapper.

5. The transmitter of claim 1 where said n training sequences have an impulse-like autocorrelation function and zero cross correlation.

6. The transmitter of claim 1 where said n training sequences are uncorrelated, and each of said n training sequences has an impulse-like autocorrelation function.

7. The transmitter of claim 1 where n=2, said generator creates a sequence s, and said encoder creates a first training sequence that is equal to −s concatenated with s, and a second training sequence that is equal to s concatenated with s.

8. The transmitter of claim 7 where said sequence s contains $N_t/2$ symbols, where $N_t$ is related to number of channel parameters, L, that a receiver which seeks to receive signals from an antenna of said transmitter may wish to estimate.

9. The transmitter of claim 1 where n=2, said generator creates a sequence s composed of sequence $d_1$ followed by sequence $d_2$, and said encoder creates a first training sequence that is −$d_1$ concatenated with $\tilde{d}_2$* and a second sequence that is either $d_2$ concatenated with $d_1$* where $\tilde{d}_2$* corresponds to the sequence $d_2$ with its elements in reverse order and converted to their respective complex conjugates, and the sequence $d_1$* corresponds to the sequence $d_1$ with its elements converted to their complex conjugate values.

10. The transmitter of claim 9 where said sequence $d_1$ and said sequence $d_2$ contain $N_t/2$ symbols each, where $N_t$ is related to number of channel parameters, L, that a receiver which seeks to receive signals from an antenna of said transmitter may wish to estimate.

11. The transmitter of claim 1 where n=2, said generator creates a sequence d, and said encoder creates a first training sequence that is −d concatenated with $\tilde{d}$*, and a second sequence that is d concatenated with d*, where the sequence d* corresponds to the sequence d with its elements converted to their complex conjugate values and the sequence $\tilde{d}$* corresponds to the sequence d with its elements in reverse order and converted to their respective complex conjugate values.

12. The transmitter of claim 1 where n=2, said generator creates a sequence d, and said encoder creates a first training sequence that is −d concatenated with $\tilde{d}$*, and a second sequence that is $\tilde{d}$ concatenated with d*, where the sequence d* corresponds to the sequence d with its elements converted to their complex conjugate values and the sequence $\tilde{d}$* corresponds to the sequence d with its elements in reverse order and converted to their respective complex conjugate values.

13. The transmitter of claim 1 where n−2, said generator creates a sequence d, and said encoder creates a first training sequence that is −d concatenated with d, and a second sequence that is $\tilde{d}$* concatenated with d*, where the sequence d* corresponds to the sequence d with its elements converted to their complex conjugate values and the sequence $\tilde{d}$* corresponds to the sequence d with its elements in reverse order and converted to their respective complex conjugate values.

14. The transmitter of claim 1 where said encoder of an applied information bit stream and said encoder for creating n training sequences are embodied in a single module that creates either said n symbol streams or said n training sequences.

15. The transmitter of claim 1 where said encoder for creating n training sequences from said symbols sequence is a trellis encoder.

16. The transmitter of claim 15 where
- (a) said where said n training sequences are selected to enable a receiver that receives said n training sequences to determine characteristics of a channel through which said n antennas communicate to said receiver,
- (b) encoder for creating n training sequences from said symbols sequence is a trellis encoder, and
- (c) said generator develops said symbols sequence to comprise $N_t+(n−2)L+m$ symbols long, where L is the number of channel parameters that describe a channel from one of said n transmitter antennas to a receiving antenna of said receiver, m is memory is said trellis encoder, and $N_t$ is not less than 2L−1.

17. The transmitter of claim 15 where said training sequence mapper employs symbols from a set composed of elements $e^{j2\pi p_k/8}$, $p_k$=0, 1, 2, . . . , 7.

18. The transmitter of claim 17 where said generator develops a symbols sequence s(k), and said encoder for creating n training sequences from said symbols sequence develops a first sequence $s_1(k)=s(k)$, and a second sequence $s_2(k)=(-1)^{p_{k-1}}s(k-1)$.

19. The transmitter of claim 18 where said sequence $s(k)$ is composed of a first segment, $s_{even}$, that comprises symbols from a set composed of $e^{i2\pi k/8}$, $p_k=0, 2, 4, 6$ and a second segment, $s_{odd}$, where $s_{odd}=\alpha s_{odd}$, and $\alpha=e^{i\pi k/4}$ for any $k=1, 3, 5, 7$.

20. The transmitter of claim 19 where said $s_{even}$ and a corresponding $\alpha$ are any one of the following:

| $S_{even}$ | $\alpha$ |
| --- | --- |
| -1 1 1 1 1 -1 -i -1 1 1 -1 1 1 | exp(i5π/4) |
| 1 1 -1 1 i i 1 -i i -1 -1 -1 1 | exp(i3π/4) |
| 1 -1 -1 -i i -i 1 1 1 -i -1 1 1 | exp(iπ/4) |
| 1 -1 -1 -i 1 -1 1 -i -i -i -1 1 1 | exp(iπ/4) |
| 1 i 1 1 i -1 -1 i 1 -1 1 i 1 | exp(iπ/4) |
| 1 i 1 i -1 -1 1 -1 -1 i 1 i 1 | exp(i3π/4) |
| 1 -i 1 1 -i -1 -1 -i 1 -1 1 -i 1 | exp(i7π/4) |
| 1 -i 1 -1 i 1 -1 -i 1 1 1 -i 1 | exp(i5π/4) |
| -1 1 1 1 1 -1 -1 -i -1 -1 1 -1 1 1 | exp(i3π/4) |
| -1 i -1 -i i 1 -i i i 1 i 1 -i 1 | exp(i7π/4) |
| -1 -i -1 i 1 i -i -i 1 -i 1 i 1 | exp(iπ/4) |
| -1 -i -1 i -1 i -i -i -1 -i 1 i 1 | exp(i3π/4) |

21. A space-time diversity transmitter that includes n transmitting antennas, where n is greater than one, comprising:
   a generator of training sequences; and
   an encoder, responsive to signals created by said generator, for developing n sequences that are applied to said n antennas, each sequence having n intervals, said sequences being characterized by matrix $$U = \begin{bmatrix} u_{11} & u_{12} & \cdots & u_{1n} \\ u_{21} & u_{22} & \cdots & u_{2n} \\ \vdots & \vdots & \ddots & \vdots \\ u_{n1} & u_{n2} & \cdots & u_{nn} \end{bmatrix}$$

such that $UU^H = KI$, where $U^H$ is the Hermitian of U, K is a constant, and I is the identity matrix, and $u_{ij}$ is a convolution matrix of sequence applied to antenna j at interval i.

22. The transmitter of claim 21 where each of said convolution matrices, $u_{ij}$, is related to $S=[s_1 \, s_2 \ldots S_n]$, where $s_i$ is a convolution matrix of a sequence $s_i(k)$ created by said generator.

23. The transmitter of claim 22 where $$U = \begin{bmatrix} -S & S \\ S & S \end{bmatrix}.$$

24. A receiver comprising an antenna, a channel estimator responsive to signals received from said antenna, and a detector response to signals received from said antenna and to signal applied by said channel estimator, the improvement comprising:
   said channel estimator is constructed (a) to receive from said antenna signal $y_1$ during a first period of $N_t/2$ symbol periods, where $N_t$ is a predetermined constant, and signal $y_2$ during a second period of $N_t/2$ symbol periods, (b) to develop matrix product $$\begin{bmatrix} r_1 \\ r_2 \end{bmatrix} = \begin{bmatrix} -S^H & S^H \\ S^H & S^H \end{bmatrix} \begin{bmatrix} y_1 \\ y_2 \end{bmatrix},$$

where S is a predetermined matrix, and $S^H$ is the Hermitian of S, (c) to develop vector signal $$h_1 = \frac{1}{K} r_1$$

and vector signal $$h_2 = \frac{1}{K} r_2,$$

where K is a predetermined constant and $r_1$ and $r_2$ are the receiver processed signals, and (d) to apply vector signals $h_1$ and $h_2$ to said detector.

25. The receiver of claim 24 where said matrix S is related to a training sequence that is sent by a transmitter to said receiver.

26. The receiver of claim 24 where dimension of said matrix S is $(N_t-L+1) \times L$, where L corresponds to number of elements in vector signal $h_1$ and in vector signal $h_2$.

27. A receiver comprising an antenna, a channel estimator responsive to signals received from said antenna, and a detector response to signals received from said antenna and to signal applied by said channel estimator, the improvement comprising:
   said channel estimator receives signals from a transmitter having n transmitting antennas, develops therefrom received signals $y_1, y_2 \ldots y_n$, during n intervals, forms a matrix of signals, and multiplies said matrix of symbols by matrix $U^H$, which is the Hermitian of U, to derive a matrix of estimate signals, where U, is dictated by said transmitter and each elements of $u_{ij}$ of matrix U is a convolution matrix of a training sequence applied to transmitting antenna j at interval i.

28. A receiver comprising an antenna, a channel estimator responsive to signals received from said antenna, and a detector response to signals received from said antenna and to signal applied by said channel estimator, the improvement comprising:
   said channel estimator receives signals from a transmitter having n transmitting antennas, develops therefrom received signal vectors $y_1$ and $y_2$, from two sets of received symbol periods, develops $$\begin{bmatrix} h_{eq}^{even} \\ h_{eq}^{odd} \end{bmatrix} = KS^H \begin{bmatrix} y_1 \\ y_2 \end{bmatrix},$$

where K is a preselected constant, $h^{even}_{eq}$ is the estimate of the transfer function determined from even constellation symbols, $h^{odd}_{eq}$ is the estimate of the transfer function determined from odd constellation symbols, and $S^H$ is a preselected matrix, and develops estimate signal $$h_1 = \frac{h^{even}_{eq} + h^{odd}_{eq}}{2}$$

that is applied to said detector, and estimate signal $$h_2 = \frac{h^{even}_{eq} - h^{odd}_{eq}}{2}$$

that is applied to said detector.

\* \* \* \* \*